US012438295B2

(12) United States Patent
Roman, Jr. et al.

(10) Patent No.: US 12,438,295 B2
(45) Date of Patent: Oct. 7, 2025

(54) JUNCTION DEVICE FOR FLAT FLEXIBLE CABLES

(71) Applicant: TE Connectivity Solutions GmbH, Steinach (CH)

(72) Inventors: Paul D. Roman, Jr., Middletown, PA (US); Raghunandan Shrikanth Shanbhag, Bangalore (IN); William J. Remaley, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 340 days.

(21) Appl. No.: 18/151,078

(22) Filed: Jan. 6, 2023

(65) Prior Publication Data

US 2024/0145961 A1 May 2, 2024

(30) Foreign Application Priority Data

Oct. 31, 2022 (IN) ............................ 202241061872

(51) Int. Cl.
*H01R 12/78* (2011.01)

(52) U.S. Cl.
CPC ................................... *H01R 12/78* (2013.01)

(58) Field of Classification Search
None
See application file for complete search history.

(56) References Cited

U.S. PATENT DOCUMENTS

| | | | | |
|---|---|---|---|---|
| 6,468,102 | B1 * | 10/2002 | Murakami | H01R 4/2429 439/402 |
| 7,618,282 | B2 * | 11/2009 | Wu | H01R 12/592 439/496 |
| 10,749,301 | B2 * | 8/2020 | Matsui | H01R 13/506 |

* cited by examiner

*Primary Examiner* — Ross N Gushi

(57) ABSTRACT

A junction device for flat flexible cables (FFCs) includes a device housing, a power contact, a signal contact assembly, and a data contact assembly. The power contact defines an input power FFC connection, an output power FFC connection, and a breakout power FFC connection, with the input, output and breakout FFC connections being electrically interconnected. The signal contact assembly defines an input signal FFC connection, an output signal FFC connection, and a breakout signal FFC connection. The signal contact assembly is adapted to output a signal to the breakout signal FFC connection indicative of a signal received at the input signal FFC connection. The data contact assembly includes an input data FFC connection, an output data FFC connection, and a breakout data FFC connection. The data contact assembly is adapted to output a data signal received at the input FFC connection from the output FFC connection and the breakout FFC connection.

20 Claims, 6 Drawing Sheets

JUNCTION DEVICE FOR FLAT FLEXIBLE CABLES

CROSS-REFERENCE TO RELATED APPLICATIONS

This application claims the benefit of the filing date under 35 U.S.C. § 119(a)-(d) of Indian Patent Application No. 202241061872 filed Oct. 31, 2022.

FIELD OF THE INVENTION

The present disclosure relates to electrical devices, and more particularly, to a junction device for flat flexible cables.

BACKGROUND

Flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.). These connections require the formation of break-out or umbilical connections to the various components from one or more backbone harnesses.

Accordingly, there is a need to develop quick, robust systems and methods for forming these junctions.

SUMMARY

According to an embodiment of the present disclosure, a junction device for flat flexible cables (FFCs) includes a device housing, a power contact, a signal contact assembly, and a data contact assembly. The power contact defines an input power FFC connection, an output power FFC connection, and a breakout power FFC connection, with the input, output and breakout FFC connections being electrically interconnected. The signal contact assembly defines an input signal FFC connection, an output signal FFC connection, and a breakout signal FFC connection. The signal contact assembly is adapted to output a signal to the breakout signal FFC connection indicative of a signal received at the input signal FFC connection, as well as pass this input signal to the output signal FFC connection. The data contact assembly includes an input data FFC connection, an output data FFC connection, and a breakout data FFC connection. The data contact assembly is adapted to output a data signal received at the input FFC connection from the output FFC connection and the breakout FFC connection.

BRIEF DESCRIPTION OF THE DRAWINGS

The invention will now be described by way of example with reference to the accompanying Figures, of which.

DETAILED DESCRIPTION OF THE EMBODIMENTS

Figure 1:
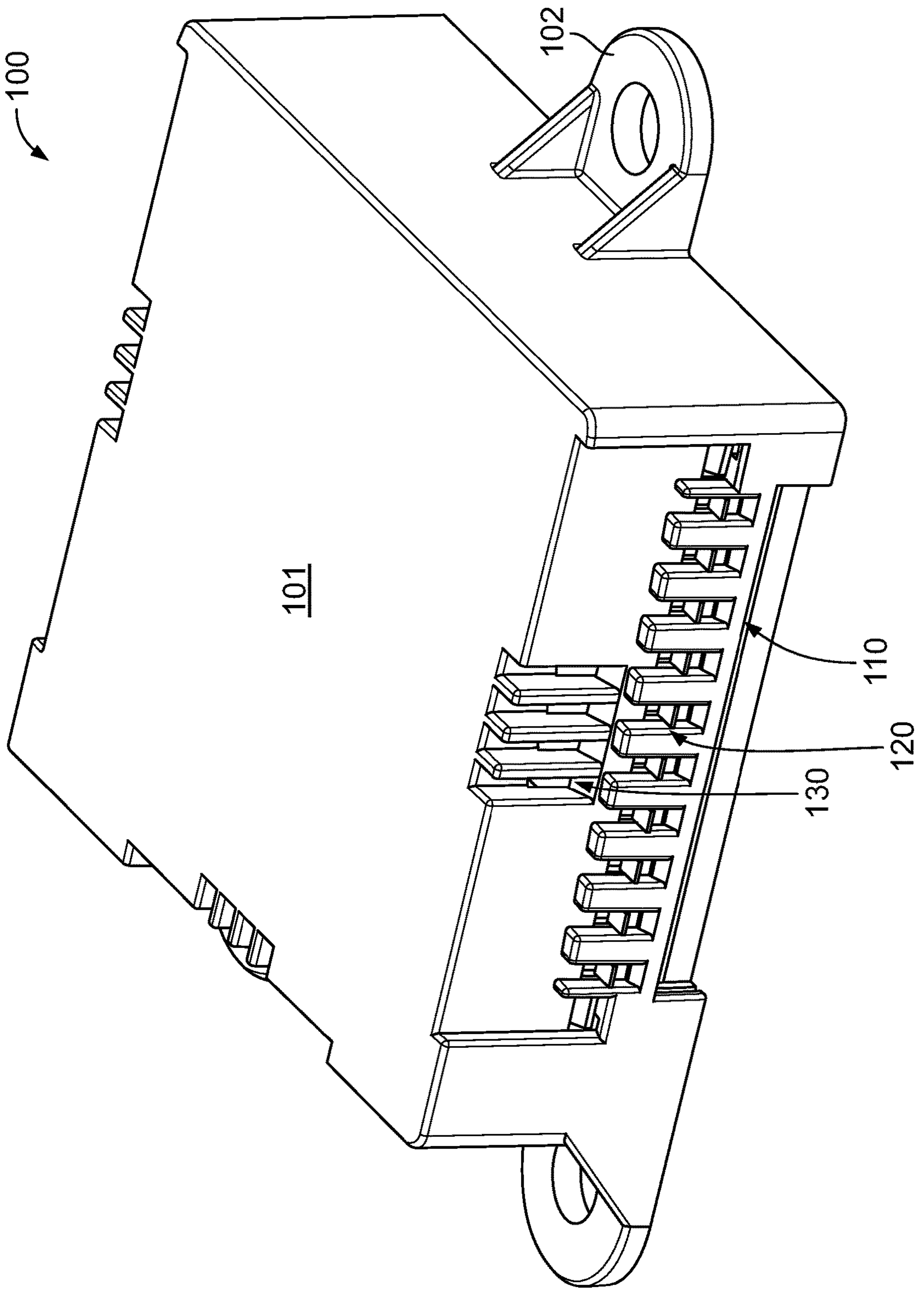
FIG. 1 is perspective view of an electrical junction device for FFCs according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include an electrical junction device adapted to electrically connect a main FFC harness, including separate power, signal and data channels or FFCs, to various FFC break-out connections or umbilicals. Referring generally to FIG. 1, an electrical junction device 100 for use with flat flexible cables (FFCs) is shown. The device 100 generally includes a housing 101, such as an insulating polymer housing. The housing 101 may define one or more mounting tabs 102 for fixing its position in an installed state. According to one embodiment, the device 100 is adapted to connected between power, signal and data backbone FFCs (see FIG. 2), via corresponding connections 110,120,130, and break out these signals on an as-desired basis. As described herein, the type of FFC (power, signal, data, etc.) is merely representative for the purposes of this description. The device 100 may be used as a junction for FFCs or other non-FFC cables of any type or application without departing from the scope of the present disclosure. As will be set forth in detail herein, the device is adapted to generate breakout signal connections from each of these backbone sources, and has the ability to be reconfigurable, particularly to selectively connect to various conductors of a signal FFC depending on the application.

Figure 2:
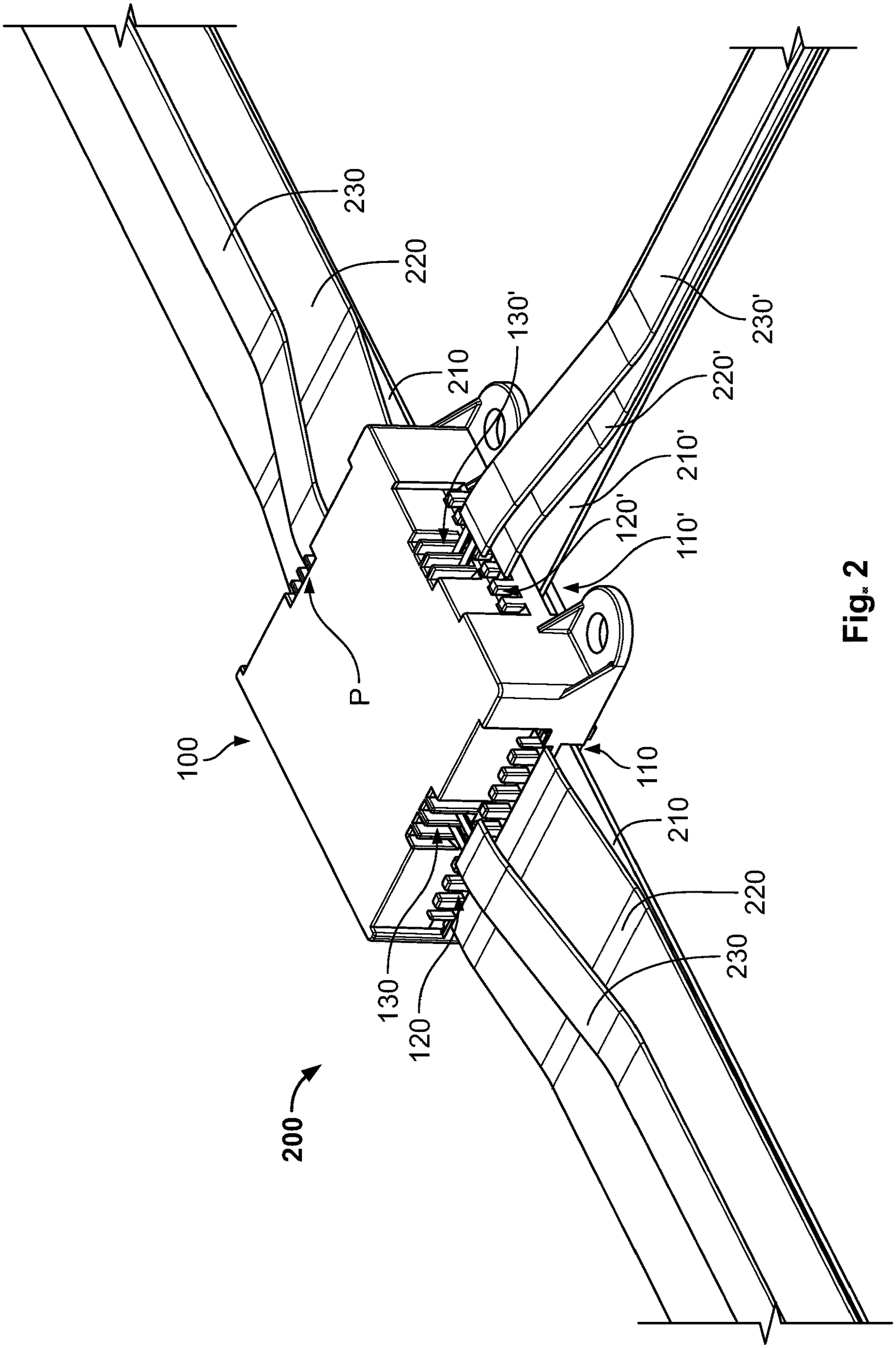
FIG. 2 is perspective view of an FFC cable assembly utilizing the electrical junction device of FIG. 1.

FIG. 2 illustrates the electrical junction device 100 in use in an FFC cable assembly 200. As shown, the device 100 passes backbone power, signal and data therethrough in the indicated direction P between respective power, signal and data backbone FFCs 210,220,230. The device is adapted to generate breakout connections from these backbone sources. Specifically, the device includes a power breakout connection 110', a signal breakout connection 120', and a data breakout connection 130'. Respective breakout power, signal and data FFCs 210',220',230' are operatively connected to these connections to, for example, establish power, signal and/or data connections between the backbone and remotely located component(s).

Figure 3:
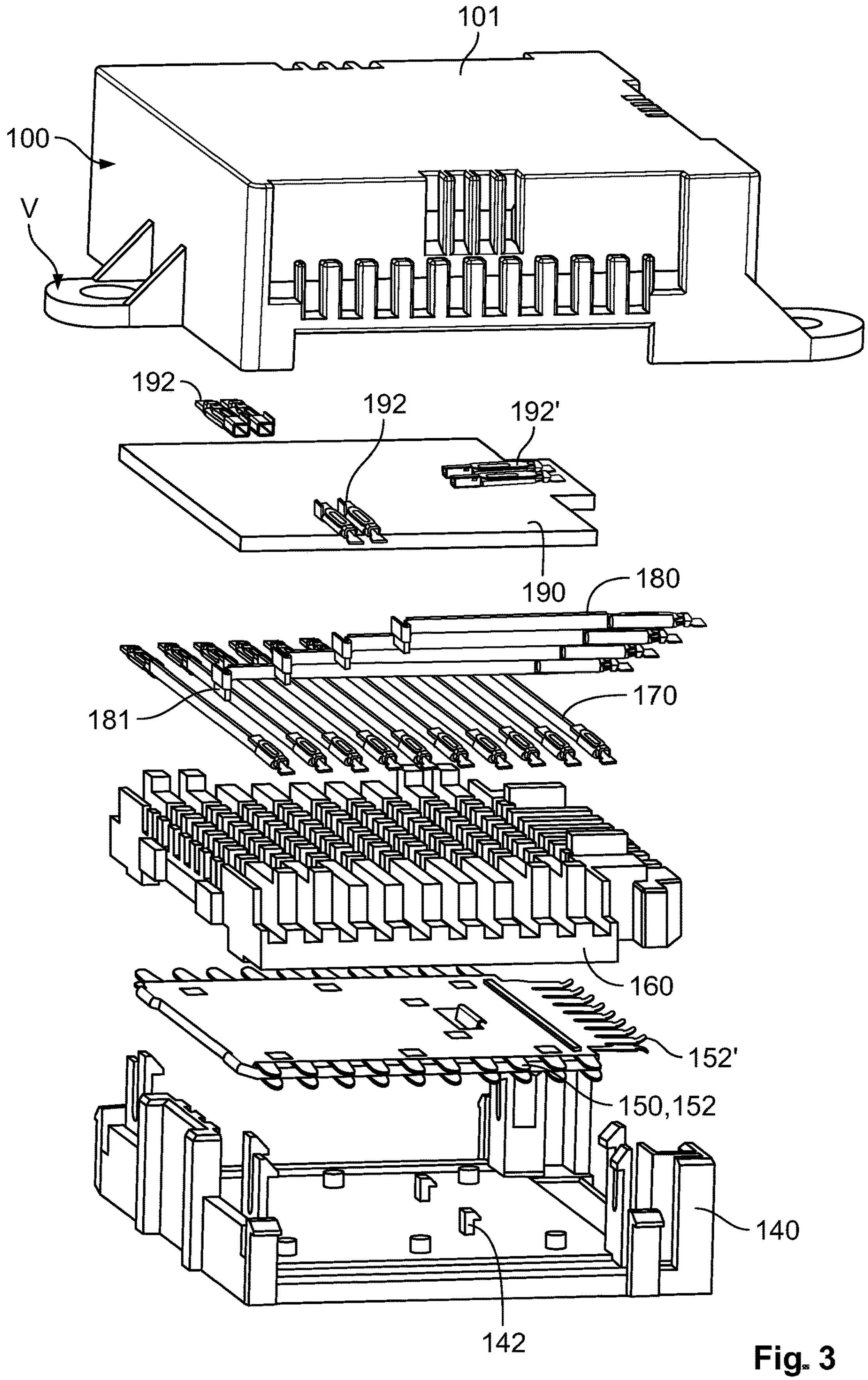
FIG. 3 is an exploded perspective view of the electrical junction device of FIG. 1.

FIG. 3 provides an exploded view of the electrical junction device 100 according to one embodiment of the present disclosure. As shown, the assembly includes a base 140, for example, an insulating polymer structure sized to support a remainder of the assembly. The assembly further includes a conductive power connector or contact 150 having respective backbone and breakout terminals or contacts 152,152'. The contact 150 is sized to be arranged on the base 140. The signal backbone breakout is handled by a signal contact assembly including a contact housing 160, a plurality of backbone signal contacts 170, and a plurality of umbilical or breakout signal contacts 180. The data backbone breakout is achieved via a data contact assembly including a printed circuit board (PCB) 190 and associated backbone and breakout contacts 192,192', respectively. The above components are sized to be stacked, and arranged under the outer device housing 101. In the exemplary embodiment, the base 140 defines a plurality of latches 142 for engaging with complementary features or sidewalls of the power contact 150, the contact housing 160 and/or the PCB 190 for securing each element in place and to the base. See also FIGS. 4 and 5.

Figure 4:
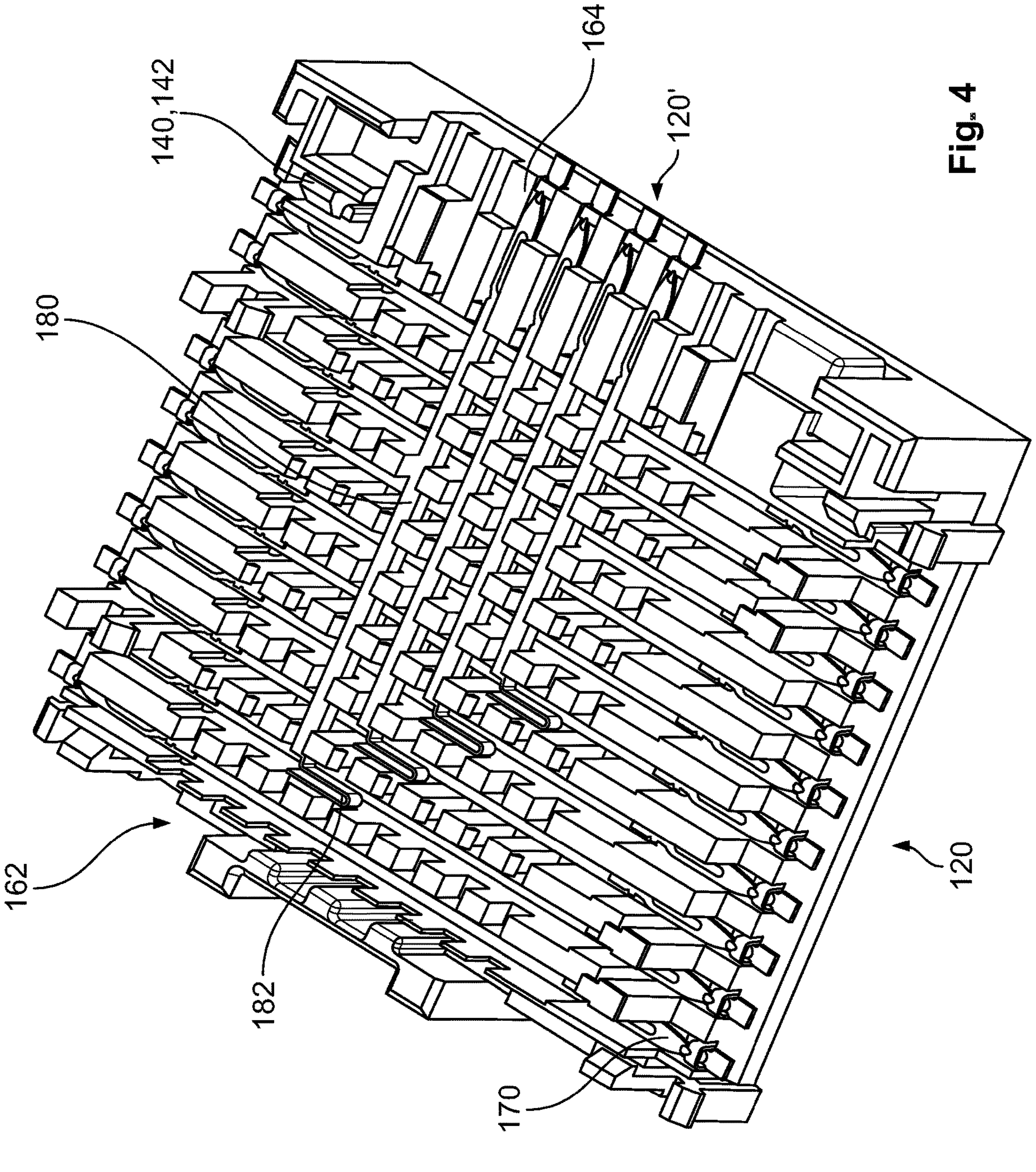
FIG. 4 is a partially assembled view of the electrical junction device of FIG. 1.

With reference now to FIG. 4, the ends of each backbone contact 170 connect to a conductor of one of the backbone signal FFCs 220 (see FIG. 2). Each breakout contact 180 has a first end adapted to contact one of the backbone contacts 170, and a second end adapted to connect to the breakout signal FFC 220' (see FIG. 2). The contact housing 160 defines an electrically insulative element adapted to hold the backbone contacts 170 and breakout contacts 180. Specifically, the housing 160 defines a grid of openings 162 forming open rows and columns, or a grid of perpendicularly oriented and intersecting slots. With the backbone contacts 170 arranged on, or within respective slots formed by, the housing 160, the placement of the breakout contacts 180 within the grid determines which of the breakout contacts establishes electrical contact with which conductor of the backbone signal FFC(s) 220, and thus the breakout FFC 220'.

Figure 5:
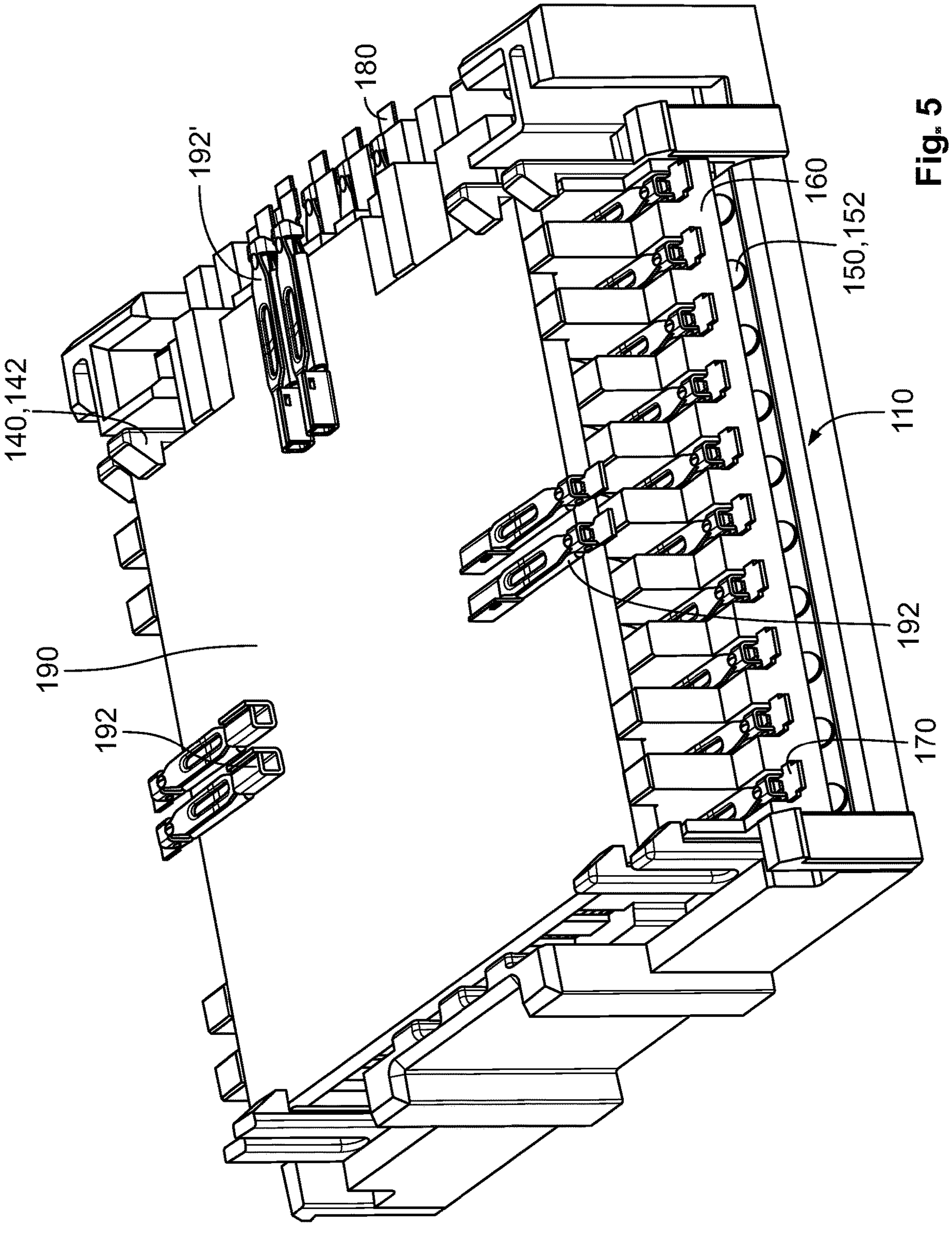
FIG. 5 is another partially assembled view of the electrical junction device of FIG. 1.

As the breakout contacts 180 are generally elevated above the backbone contacts 170 for the purpose of isolation, each breakout contact 180 defines a downwardly extending leg 181, as shown in FIG. 3, for establishing contact with one a single one of the backbone contacts. Downward pressure on these interfaces may be generated by securing the PCB 190 over the contact housing 160, as shown in FIG. 5. The opposite end of each breakout contact 170 is supported on a raised support structure 164. As shown, the support structure 164 defines recesses corresponding to each column and receiving each breakout contact 180. Further, axial motion of each breakout contact 180 may be prevented or limited by a perpendicularly-extending elastic leg 182 formed on the end of each contact.

FIG. 5 illustrates an assembled device 100 with the housing 101 removed. As shown, the PCB 190 is received within a recessed top surface of the contact housing 160 and supports the backbone terminals 192 and breakout terminals 192' thereon. The elastic latches 142 of the base 140 engage a top surface of the PCB 190 for retaining the component stack together.

Figure 6:
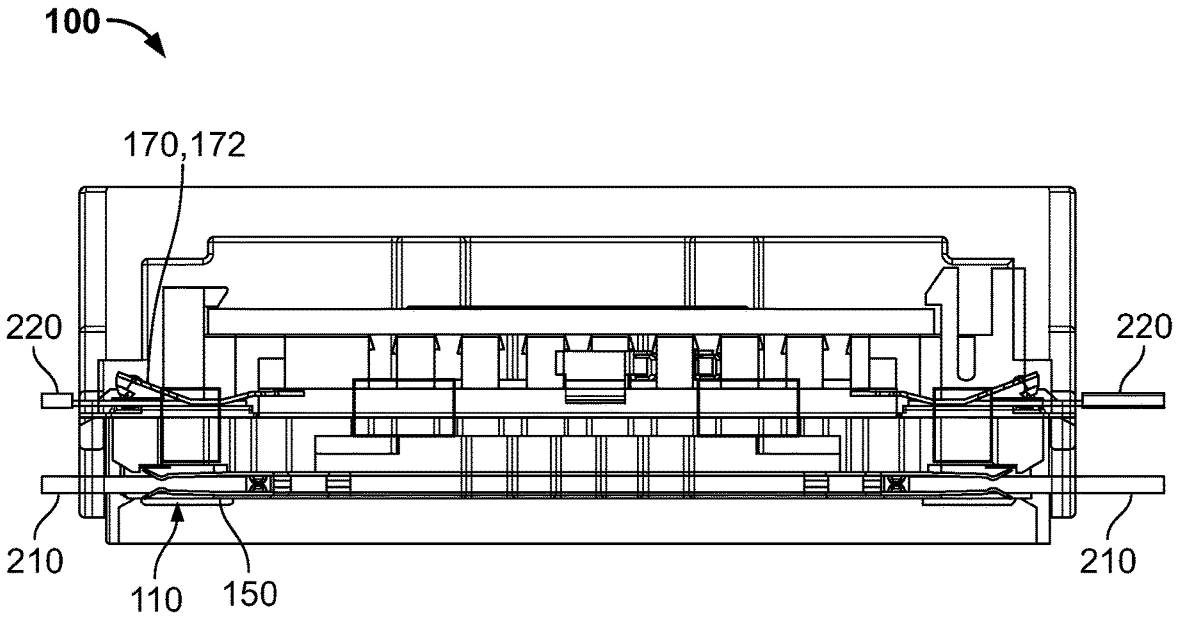
FIG. 6 is a side cross-sectional view of the electrical junction device of FIG. 1 in an initial installation state.
Figure 7:
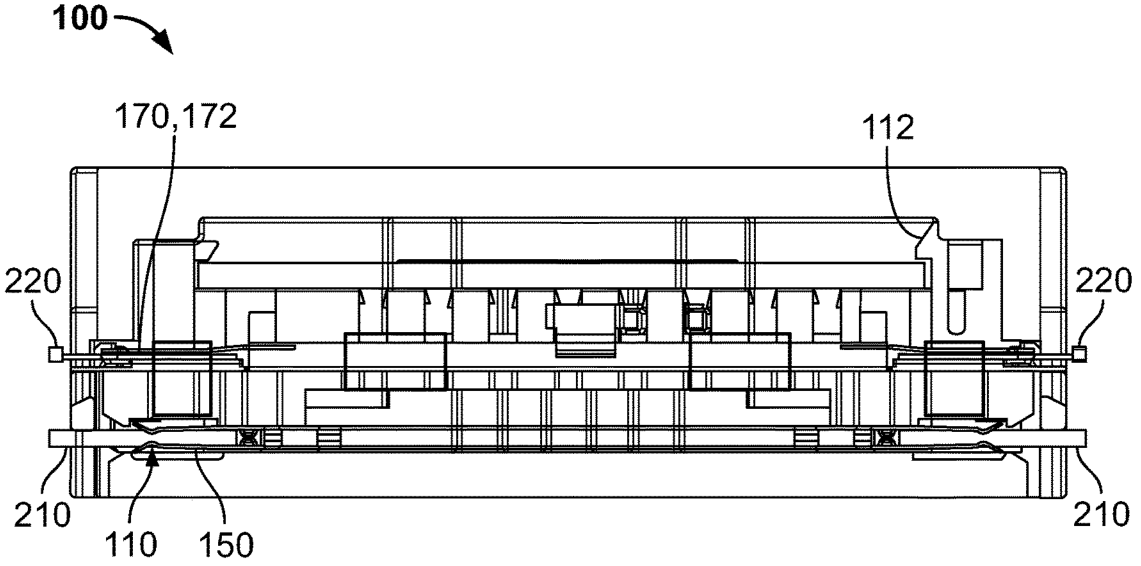
FIG. 7 is a side cross-sectional view of the electrical junction device of FIG. 1 in an installed state.

Referring now to FIG. 6, the device 100 is shown with the backbone power and signal FFCs 210,220 inserted into two sides of the device. The backbone power FFC 210 is electrically connected to the power contact 150. With a latch 172 of a terminal end of each backbone contact 170 in an open position, exposed conductors of the backbone signal FFCs 220 are inserted into the terminal ends of the backbone contacts 170. As shown in FIG. 7, the latches 172 are closed, securing the exposed conductors of the backbone signal FFCs 220 to the backbone contacts 170. As a result, signal will freely pass through the device 100 between series-connected backbone signal FFCs 220. While not shown, similar latching terminals, or other forms of termination, may be used to establish electrical connections between the conductors the breakout FFCs 210',220',230' and the breakout contacts 180.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A junction device for flat flexible cables (FFCs), comprising:

a device housing;

a power contact arranged within the device housing and defining an input power FFC connection, an output power FFC connection, and a breakout power FFC connection, the input, output and breakout FFC connections being electrically interconnected;

a signal contact assembly arranged within the device housing and defining an input signal FFC connection, an output signal FFC connection, and a breakout signal FFC connection, the signal contact assembly adapted to output a signal to the breakout signal FFC connection indicative of a signal received at the input signal FFC connection; and a data contact assembly arranged within the device housing and including a printed circuit board having an input data FFC connection, an output data FFC connection, and a breakout data FFC connection fixed thereto.

2. The device of claim 1, wherein the data contact assembly is adapted to output a data signal received at the input FFC connection from the output FFC connection and the breakout FFC connection.

3. The device of claim 1, wherein the signal contact assembly includes:

a plurality of signal contacts, each having ends adapted to connect between conductors of an FFC; and a plurality of breakout contacts, each having a first end contacting one of the signal contacts and a second end adapted to connect to a breakout signal FFC.

4. The device of claim 3, further comprising a base, the power contact, the signal contact assembly, and the data contact assembly supported on the base.

5. The device of claim 4, wherein the power contact is arranged on the base, the signal contact assembly is arranged over the power contact, and the data contact assembly is arranged over the signal contact assembly.

6. The device of claim 4, wherein the base comprises a plurality of latches for securing the power contact, the signal contact assembly, and the data contact assembly thereto.

7. The device of claim 3, wherein the signal contact assembly further comprises a contact housing supporting the signal contacts and the breakout contacts.

8. The device of claim 7, wherein the signal contacts are arranged on the contact housing in a first direction, and the breakout contacts are arranged on the contact housing in a second direction, distinct from the first direction.

9. The device of claim 8, wherein the contact housing defines a plurality of openings defining rows and columns, the signal contacts arranged in the rows and the breakout contacts arranged within the columns.

10. The device of claim 9, wherein the contact housing elevates at least portions of the plurality of breakout contacts above the signal contacts.

11. The device of claim 10, wherein each breakout contact comprises a leg portion extending into a row of a signal contact with which it is electrically connected.

12. The device of claim 11, the leg portion defines a downwardly extending protrusion for engaging with an upwardly facing surface of a signal contact.

13. A junction device for flat flexible cables (FFCs), comprising:

a device housing;

a power contact arranged within the device housing and defining an input power FFC connection, an output power FFC connection, and a breakout power FFC connection, the input, output and breakout FFC connections being electrically interconnected;

a signal contact assembly arranged within the device housing and defining an input signal FFC connection, an output signal FFC connection, and a breakout signal FFC connection, the signal contact assembly adapted to output a signal to the breakout signal FFC connection indicative of a signal received at the input signal FFC connection;

a data contact assembly arranged within the device housing and including an input data FFC connection, an output data FFC connection, and a breakout data FFC connection; and a base including a plurality of latches, the power contact, the signal contact assembly and the data contact assembly supported on the base and secured to the base via the plurality of latches.

14. The device of claim 13, wherein the power contact is arranged on the base, the signal contact assembly is arranged over the power contact, and the data contact assembly is arranged over the signal contact assembly.

15. A junction device for flat flexible cables (FFCs), comprising:

a device housing;

a power contact arranged within the device housing and defining an input power FFC connection, an output power FFC connection, and a breakout power FFC connection, the input, output and breakout FFC connections being electrically interconnected;

a signal contact assembly arranged within the device housing and defining an input signal FFC connection, an output signal FFC connection, and a breakout signal FFC connection, the signal contact assembly adapted to output a signal to the breakout signal FFC connection indicative of a signal received at the input signal FFC connection, the signal contact assembly including:

a plurality of signal contacts, each having ends adapted to connect between conductors of an FFC; and a plurality of breakout contacts, each having a first end contacting one of the signal contacts and a second end adapted to connect to a breakout signal FFC, the first end including a leg portion defining a downwardly extending protrusion engaging with an upwardly facing surface of a signal contact; and a data contact assembly arranged within the device housing and including an input data FFC connection, an output data FFC connection, and a breakout data FFC connection.

16. The device of claim 15, wherein the signal contact assembly further comprises a contact housing supporting the signal contacts and the breakout contacts.

17. The device of claim 16, wherein the signal contacts are arranged on the contact housing in a first direction, and the breakout contacts are arranged on the contact housing in a second direction, distinct from the first direction.

18. The device of claim 17, wherein the contact housing defines a plurality of openings defining rows and columns, the signal contacts arranged in the rows and the breakout contacts arranged within the columns.

19. The device of claim 18, wherein the contact housing elevates at least portions of the plurality of breakout contacts above the signal contacts.

20. The device of claim 19, wherein the leg portion extends into the row of the signal contact with which it is electrically connected.

* * * * *